Patented Nov. 17, 1953

2,659,690

UNITED STATES PATENT OFFICE 2,659,690

EFFERVESCENT BARIUM SULFATE-PECTIN X-RAY CONTRAST COMPOSITION

Elmer H. Slaybaugh, Parsons, Kans.

No Drawing. Application June 8, 1950, Serial No. 166,976

2 Claims. (Cl. 167—95)

This invention relates to a composition in powder form for use in the fluoroscopic observation and roentgenography of the esophagus, rugae of the intestinal tract and gastroenteric mucosa and enema contrasts, instead and as an improvement upon and simplification of the presuspended form in a semi-viscid liquid state as set forth in my prior application, Serial No. 732,372, filed March 4, 1947, and issued as Patent No. 2,461,702 on February 15, 1949.

This application is a continuation-in-part of my copending application Serial No. 764,248, filed July 28, 1947, now abandoned.

The objects of the invention are to improve the radiographic functions of barium sulphate to produce clearer and better radiographic depiction and to produce clearer pattern delineation of the mucosa and parts of the anatomy by providing a composition in powder form which when mixed with water will substantially immediately produce a homogeneous, mucilaginous liquid of such viscosity or density to form a stable suspension of the barium sulphate evenly distributed therein; to provide a composition in powder form consisting of pectin, barium sulphate, a sweetening material, a weak organic acid, and a salt of a strong base and weak acid in such proportions which when mixed with a suitable quantity of water or other suitable diluent will substantially immediately produce a mucilaginous liquid having a colloidal suspension of the pectin of such density that the barium sulphate is held in physical suspension; to provide a composition which when mixed with the correct proportion of water produces a mucilaginous suspension of barium sulphate having a desirable viscosity and a desirable pH which is miscible with the contents of the digestive tract without affecting its chemistry or producing additional digestive function, is adherent to the rugae of the intestinal tract and gastroenteric mucosa because of the cohesive properties of the mucilaginous suspending agent which insures evenness of distribution of barium sulphate to photographic areas, is in fine evenly dispersed suspension insuring evenness of transit through the intestinal tract without causing undue sagging or pocketing of barium salts in the loops of the intestines, or in the rugae of the intestinal tract, and which prevents any irritation to the rugae of the intestinal tract.

Another object of the invention is to prepare a composition in powder form consisting of barium sulphate, pectin, a sweetening agent, a weak organic acid, and a salt of a strong base and weak acid in correct proportions which, when mixed with the correct proportion of water, results in reaction of the organic acid and the salt of the strong base and weak acid which are so adjusted relative to the pH of the pectin that when said reaction has reached its optimum there is an hydrogen ion concentration which dissolves or completes digestion of the pectin before it has time to settle and clump in a gummy mass; and to form a substantially permanent mucilaginous suspension of barium sulphate having a desired viscosity, the excess of hydrogen ion concentration or free acid being absorbed by the base whereby the pH of the mucilaginous suspension is within the range of 3 to 6 and is such that no further hydrolysis or liquefaction is produced.

Another object of the invention is to prepare a mixture which is quickly and easily prepared in less time and with less cost without requiring a preservative such as benzoic acid, for ready use, freely and readily miscible with the correct proportion of water and which retains its suspended state for long periods of time without undue settling, which is palatable, insuring patient comfort and cooperation, which is less constipating because of no sympathetic peristalsic reflex action on the duodenal mechanism impeding its transit through the system, and which obtains or produces effectiveness of opacity determined by measurements and tests as conducted by the r'meter.

Another object of the invention is to provide a suspending agent in the form of pectin for barium sulphate which avoids any chemical action or interaction between the constituents such as would produce or create any poisonous substance injurious to the human body when in use, and which will contain no possible soluble barium salts such as chlorides or sulphides or that when combined will produce any change which would result in the formation of poisonous compounds and is therefore stable, effective and unobjectionable for the reasons stated, and a perfect and safe preparation for use for the purposes stated, and is free from harsh or irritating gums or resins.

Another object of the invention is to provide a formula consisting of barium sulphate, pectin, sodium carbonate, an organic acid such as citric or tartaric acid and saccharin, in which the sodium carbonate and organic acid are in correct chemical adjustment with a given amount of pectin N. F., so that when the correct proportion of water is added a hydrotropic factor is produced which reduces the pectin to a gelatinous suspending property.

Other objects and advantages will be apparent from the following description and formula.

I have found that commercial pectin, namely pectin N. F. as obtainable in commerce varies and may in different batches have more or less acid residual remaining. Therefore a given quantity of one batch of pectin, for example 40 grains of pectin in 6 ounces of water, under normal conditions, may have a pH of 3 to 3.8, while the same quantity of pectin from another batch may have a pH range of 4 to 4.6 as determined by modern scientific methods.

I have found that the higher the acid factor or concentration of the solution the more easily and quickly the pectin goes into solution and produces a gel or emulsion. Also the higher the acid factor or concentration below 3 the thinner the emulsion and the less stable as the acid residue continues to react with the galacturonides and increases esterification, the reaction continuing until complete hydrolysis occurs reducing the density or specific gravity below that necessary to form a suspension of barium sulphate.

Conversely I have found that the lower the acid factor or concentration the slower the pectin goes into the solution to produce the emulsion, also that the lower the acid factor or increase in alkalinity range the thicker and less stable the gel as with a pH of over 6 and up to 7 to 7.5 unless sugars or sucroses are added to produce a higher alcohol, the quicker the solution hydrolyzes. I have found that a solution or emulsion which finishes with a pH within 3 to 6 is more stable, produces an emulsion of proper viscosity, does not hydrolyze or settle, is more stable to temperature variation, and is of suitable density and specific gravity to sustain in balance or suspension a given amount of barium sulphate or the like.

I have found that the use of a weak organic acid, such as tartaric or citric acid, can be used to acidulate the water, and when the pectin is placed therein the concentration of H ions hastens the digestion of the pectin to form an emulsion and that the salt of a strong base and weak acid, such as sodium carbonate, acts as a buffer by the exchange of the ions, whereby equilibrium is reached and the pectin emulsion will retain its consistency and viscosity.

Composition of barium and pectin may be prepared in the form of a liquid in which the pectin and the barium sulphate are evenly dispersed and maintained in suspension as disclosed in the Slaybaugh Patent No. 2,461,702, however, such solutions must be prepared in laboratories or the like and marketed in a liquid form, presenting a storage and shipping problem, and also requiring the use of a preservative.

This invention consists in the preparation of a barium sulphate-pectin composition in powder form preferably in a degree of fineness of 40 to 150 mesh or finer, which, when mixed with water or other suitable diluent, will quickly produce a mucilaginous suspension of barium sulphate having desirable viscosity, the pectin and barium sulphate remaining in suspension substantially indefinitely.

The composition, in powder form, preferably consists of barium sulphate, pectin N. F. a sweetening agent, a weak organic acid such as tartaric or citric acid, and a salt of a weak acid and strong base such as sodium carbonate, sodium acetate, sodium citrate or sodium bicarbonate in correct proportions, which, when mixed, as by stirring, into the correct proportions of water, causes a reaction acidulating the water and liberating a weak free acid, the concentration of which causes sufficient pectin to be dissolved substantially immediately forming an emulsion sufficient to substantially suspend the barium sulphate in the solution. The weight ratio of the barium sulphate and pectin preferably is in the order of 38 to 1. The excess hydrogen ion concentration remaining dissolves or completes digestion of the pectin before it or the barium has time to settle, the amounts of weak organic acid and salt of the strong base and weak acid being such that when the reaction has ceased, the pH of the solution is such that there is substantial equilibrium whereby the barium sulphate and pectin are sustained in suspension with no liquefaction or hydrolysis.

The composition, in powder form, made in accordance with the invention contains a suitable amount of barium sulphate and the formulas given herein are based on a quantity of three ounces (1440 grains) of barium sulphate. The other ingredients of the composition are preferably pectin N. F. 30 to 70 grains and having a pH in 6 ounces of water in the range of 4 to 4.5, tartaric acid 4 to 6 grains, sodium carbonate 2.5 to 4 grains, and saccharin up to 1½ grains, according to the sweetness desired. It is preferable that the relative proportions of the tartaric acid and sodium carbonate be adjusted according to the pH of the pectin so that when the composition is mixed with the proper amount of water, preferably 6 ounces, substantially immediately a permanent mucilaginous liquid suspension of barium sulphate is formed, said liquid having a pH in the range of 3 to 6.

It has been found that if material having a small added amount of free acid is supplied to a normal gastro-intestinal tract the gastric emptying is delayed. Acid on the duodenal side of the pylorus seems to have a greater effect on the retardation of gastric emptying than does acid on the gastric side. Alkaline solutions have been found to also exert a greater effect on the duodenal side of the pylorus, and when a markedly hypertonic alkaline solution is used, such as 5 percent solution of sodium bicarbonate, the duodenal mechanism is stimulated so intensely that nothing leaves the stomach. Therefore, it is important that the pH of the barium sulphate suspension composition be within limits which do not create abnormal motor and secretory disturbances.

For optimum results, and economy, it is preferred that the composition, in powder form, have the following formula:

| | Grains |
|---|---|
| Barium sulphate | 1440 |
| Tartaric acid | 5.6 |
| Pectin N. F. | 40 |
| Sodium carbonate | 3.5 |
| Saccharin | 1 |

In preparing the composition, it is preferable to triturate the tartaric acid and sodium carbonate to a fine powder; add the saccharin and pectin and mix thoroughly. After all ingredients are thoroughly mixed, add the barium sulphate, mixing thoroughly so that all component parts are thoroughly mixed and keep triturating until all will pass through a 40 to 150 mesh sieve. The composition, in powder form, is then packed in a suitable container for shipping and storage.

The above method of preparation is given in its simplest form for explanatory purposes. It is not intended to limit the manufacture of this product to such a simple manner, as it has been found that the range of the proportions of the ingredients and the pH are critical. Therefore accurate controls and adjustments to obtain the proper pH must be maintained. The resulting product, in powder form, when mixed with the proper amount of water, is a suspension of barium sulphate in a mucilaginous material. The result is a perfected and safe preparation of barium sulphate powder in a finely dispersed, colloidal-like state of suspension, insuring better diagnostic accuracy in making possible more clear cut picture delineation. This preparation is especially prepared to meet the requirements in technique for depiction of the esophagus, rugae and gastroenteric mucosa, possessing both adhesive and cohesive properties and free from harsh or irritating gums or resins. The media insures more clearly defined pictures when taking pictures of parts of the body by X-ray, or for fluoroscopic examination and observation of the esophagus, the rugae of the intestinal tract and more distinct visualization of the gastroenteric mucosa and especially also of the rugae or folds of the intestines and as a distinct aid for rapid fluoroscopic observation, because it does not interfere with normal anatomical functions either in the upper or lower gastro tracts as it is properly adjusted whereby the pH or acidity is substantially that of the normal gastric acid secretion of an average person.

By way of clarifying an understanding of the invention, attention is directed to the fact that pectinum or pectin N. F. is authoritatively described as a purified carbohydrate product obtained from the dilute acid extract of citrus peal or apple pomace consisting chiefly of partially methoxylated polygalacturonic acids. A weak organic acid, for example tartaric acid or citric acid, and a salt of the strong base and weak acid, for example sodium carbonate, are reactors in proper chemical adjustment so that when water is added the reaction between the two salts produces a hydrotropic and/or chemotropic factor which quickly puts the pectin in solution producing a thin gel. This reaction produces a very slight effervescence which is due to the release of the carbon dioxide, however, the effervescence is so slight that it performs no mechanical function as the dispersion is accomplished by stirring. The effervescence ceases in a relatively short time, and after such cessation there is an excess of hydrogen ion concentration remaining which dissolves or completes digestion of the pectin before it has time to settle. The pH of the liquid is believed to be approximately 1.5 to 2.2 during the digestion of the pectin. The hydrogen ion concentration during the reversible reaction is such that sufficient pectin is digested and dissolved substantially immediately to suspend the amount of barium sulphate in the composition and there is not enough undissolved pectin remaining that will settle down to the bottom before the excess hydrogen ions will complete their digestion. The excess free acid unites with the salt of a strong base and weak acid after digestion of the pectin to form a stable suspension which does not hydrolyze or thin out. However, it has been found that if the reactors are adjusted to neutralize each other during the reaction, the pectin does not dissolve until after a number of hours.

The reactors do not react against or with the barium sulphate as determined by chemical assay and analysis for the possible presence of soluble barium salts, such as chlorides and sulphides also determined by acidifying with hydrochloric acid. Also, there is no indication that any change has taken place or there is any possibility of having any poisonous compounds formed. Therefore, the importance of the product is the fact that there is no chemical reaction or interaction between the tartaric acid and sodium carbonate with the barium sulphate.

A stable composition is produced in the fact that the use of pectin in the manner and with the ingredients shown will produce a suspending agent when water is added for the barium sulphate, that will not cause any injurious effect due to the chemical actions therein. The barium sulphate with a molecular weight of 233.42 when prepared with special care and subsequently purified, forms one of the most insoluble and also inert substances known to chemistry and is especially valuable in outlining the alimentary tract for X-ray work. It is insoluble in water, in organic solvents, and in aqueous dilute solutions of acid and alkalies.

The saccharin in the composition is used as a sweetening agent to insure a better state of palatability. There is no chemical action or interaction occurring between the saccharin and any of the ingredients.

The molecule of the natural high polymer pectin is composed principally of anhydrogalacturonic acid residues, partially methyl esterified and linked together to form a long chain. Non-galacturonide materials, galactan and araban may constitute one-third or more of the weight of pectin. The characteristic properties of pectin, gelatin, film formation, and high viscosity in dilute solutions are derived from the polygalacturonide chain, the non-galacturonide constituents merely acting as diluent.

The accelerated digestion time of pectin in my composition, on addition of water, is obtained by two separate actions. The first, the removal of inactive constituents. It is assumed the gel forming ability of pectin is greater after the precipitation of the non-galacturonide material with the consequent increase in galacturonides. This can be accomplished by two methods, by de-esterification with enzymes which is slow and although it reduces the methyl ester groups, only partly reduces the non-galacturonides, or by the acid method, which I use, in which a weak acid, carbonic acid, at the proper pH, is introduced and the resulting hydrogen ion concentration partially removes the methyl ester groups and the non-galacturonides more rapidly and at approximately the same rate.

The two ingredients in my preferred formula which bring about the formation of carbonic acid are tartaric acid and sodium carbonate, the reaction, $H_2C_4H_4O_6 + Na_2CO_3 \rightarrow Na_2C_4H_4O_6 + H_2CO$, a simple form of double decomposition in which carbonic acid, one of the weakest and most unstable acids, breaks down in this method $H_2CO_3 \rightarrow H_2O + CO_2$, forming carbon dioxide and water. The important feature in this reaction is that the acid factor is present only long enough to accomplish the digestion of the pectin, and then is dissipated in the natural volatilization of carbon dioxide and any excess free acid is united with the sodium carbonate. Thus the reaction reaches its equilibrium after only a part of the methyl ester groups and non-galacturonide content has been de-esterified. If a strong acid were used and the action prolonged, the suspending qualities of pectin would be destroyed in proportion to the length of time the acid remains in excess.

Another action in my composition which speeds up the solution of pectin is the hydrotropic or chemotropic factor involved, the tendency of cells to turn or move in a certain direction under the influence of water or chemical stimuli. It is the oxonium ion ($H_3O+$) released in the reaction of the tartaric acid and sodium carbonate which causes a movement of the water molecules toward the pectin molecules, this movement exerting enough force to speed up the process of digestion or solvent properties of the water. Thus, by proper chemical adjustment between the reactors and the pectin, the desired end is obtained.

It is to be seen that an advantage of the composition is that it may be made up and kept in large quantities for immediate mixing and use with a diluent. Thus it will be seen that I have provided a very desirable mixture for the purposes stated, possessing all the advantages enumerated, and it is to be understood that the invention is not limited to the proportions stated except as determined by the claims.

What I claim and desire to secure by Letters Patent is:

1. A composition in dry powder form which when mixed with water substantially immediately forms a suspension of media to be used internally for fluoroscopic observations and roentgenography of the esophagus, rugae of the intestinal tract, and gastroenteric mucosa and as an enema to produce contrasts for study and visualization of the lower bowel tract comprising, a mixture of the following ingredients and proportions, barium sulphate, pectin NF 30 to 70 grains, sodium carbonate 2.5 to 4 grains, and a dry organic acid selected from the group consisting of tartaric and citric acid, each being in a finely divided state, said composition being characterized by the fact that when mixed with water the organic acid, sodium carbonate and pectin react to produce a hydrogen ion concentration which accelerates digestion of the pectin whereby substantially immediately a viscous, homogeneous, mucilaginous, stabilized colloidal liquid is formed in which the barium sulphate and pectin are sustained in suspension, said sodium carbonate and organic acid being adjusted in quantity relative to the pH of the pectin in a selected quantity of water whereby when the composition is mixed with water and reaction ceases the pH of the resulting solution is in the range of 3 to 6.

2. A composition in dry powder form which when mixed with water substantially immediately forms a suspension of media to be used internally for fluoroscopic observations and roentgenography of the esophagus, rugae of the intestinal tract, and gastroenteric mucosa and as an enema to produce contrasts for study and visualization of the lower bowel tract comprising, a mixture of the following ingredients and proportions, barium sulphate 3 ounces, pectin NF 40 grains, sodium carbonate 3.5 grains, saccharin 1 grain, and tartaric acid 5.6 grains, each ingredient being in a finely divided state, said composition being characterized by the fact that when mixed with water the tartaric acid, sodium carbonate and pectin react to produce a hydrogen ion concentration which accelerates the digestion of the pectin whereby substantially immediately a viscous, homogeneous, mucilaginous, stabilized colloidal liquid is formed in which the barium sulphate and pectin are sustained in suspension, said sodium carbonate and tartaric acid being adjusted in quantity relative to the pH of the pectin in a selected quantity of water, whereby when the composition is mixed with water and reaction ceases the pH of the resulting solution is in the range of 3 to 6.

ELMER H. SLAYBAUGH.

References Cited in the file of this patent

UNITED STATES PATENTS

| Number | Name | Date |
|---|---|---|
| Re. 19,197 | Jameson | June 5, 1934 |
| 2,461,702 | Slaybaugh | Feb. 15, 1949 |

OTHER REFERENCES

Hiss and Ebert, New Standard Formulary, 5th Edition (1920), page 325. (Copy in Division 43.)

Journal of Obstetrics and Gynaecology of the British Empire, volume 51, December 1944, page 516.